United States Patent
Shaji et al.

(10) Patent No.: US 9,412,043 B2
(45) Date of Patent: *Aug. 9, 2016

(54) SYSTEMS, METHODS, AND COMPUTER PROGRAM PRODUCTS FOR SEARCHING AND SORTING IMAGES BY AESTHETIC QUALITY

(71) Applicant: EyeEm Mobile GmbH, Berlin (DE)

(72) Inventors: Appu Shaji, Berlin (DE); Ramzi Rizk, Berlin (DE)

(73) Assignee: EYEEM MOBILE GMBH, Berlin (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/506,103

(22) Filed: Oct. 3, 2014

(65) Prior Publication Data

US 2016/0098618 A1   Apr. 7, 2016

Related U.S. Application Data

(63) Continuation-in-part of application No. 14/506,097, filed on Oct. 3, 2014, now Pat. No. 9,280,565.

(51) Int. Cl.
*G06K 9/00* (2006.01)
*G06K 9/34* (2006.01)
(Continued)

(52) U.S. Cl.
CPC ............ *G06K 9/623* (2013.01); *G06K 9/00624* (2013.01); *G06K 9/4652* (2013.01);
(Continued)

(58) Field of Classification Search
CPC . G06K 9/623; G06K 9/6228; G06K 9/00624; G06K 9/4652; G06K 9/4671; G06K 2009/4666; G06K 2009/4657; G06K 9/6218; G06K 9/6255; G06K 9/68; G06K 9/80; G06T 5/40; G06T 7/0081; G06T 5/009
USPC ......... 382/160, 100, 168, 173, 181, 154, 155, 382/162, 232, 254, 276
See application file for complete search history.

(56) References Cited

U.S. PATENT DOCUMENTS 8,594,385 B2 * 11/2013 Marchesotti ........... G06K 9/036
                                                          382/112
8,732,175 B2 *  5/2014 Butterfield ........ G06F 17/30265
                                                          707/748

(Continued)

OTHER PUBLICATIONS

Achanta et al. "Slic superpixels compared to state-of-the-art superpixel methods," IEEE Transactions on Pattern Analysis and Machine Intelligence, vol. 34(11):2274-2281, 2012.*

(Continued)

*Primary Examiner* — Sheela C Chawan
(74) *Attorney, Agent, or Firm* — Rothwell, Figg, Ernst & Manbeck, P.C.

(57) ABSTRACT

A system, method, and computer program product for assigning an aesthetic score to an image. A method of the present invention includes receiving an image comprising a set of global features. The method includes extracting a set of global features for the image. The method further includes encoding the extracted set of global features into a high-dimensional feature vector. The method further includes reducing the dimension of the high-dimensional feature vector. The method further includes applying a machine-learned model to assign an aesthetic score to the image, wherein a more aesthetically-pleasing image is given a higher aesthetic score and a less aesthetically-pleasing image is given a lower aesthetic score.

25 Claims, 20 Drawing Sheets

(51) Int. Cl.
*G06K 9/36* (2006.01)
*G06K 9/62* (2006.01)
*G06T 7/00* (2006.01)
*G06T 5/00* (2006.01)
*G06T 5/40* (2006.01)
*G06K 9/46* (2006.01)

(52) U.S. Cl.
CPC ............ *G06K9/4671* (2013.01); *G06K 9/6228* (2013.01); *G06T 5/009* (2013.01); *G06T 5/40* (2013.01); *G06T 7/0081* (2013.01); *G06T 7/0097* (2013.01); *G06K 2009/4657* (2013.01); *G06K 2009/4666* (2013.01); *G06T 2200/28* (2013.01); *G06T 2207/10004* (2013.01); *G06T 2207/10024* (2013.01); *G06T 2207/20081* (2013.01); *G06T 2207/30168* (2013.01); *G06T 2210/36* (2013.01)

(56) References Cited

U.S. PATENT DOCUMENTS

| | | | | |
|---|---|---|---|---|
| 8,755,596 | B2* | 6/2014 | Datta | G06K 9/00624 382/160 |
| 8,862,520 | B2* | 10/2014 | Agarwal | G06N 99/005 706/12 |
| 8,954,423 | B2* | 2/2015 | Chica | G06F 17/30699 382/162 |
| 9,082,047 | B2* | 7/2015 | Marchesotti | G06K 9/627 |
| 2006/0242139 | A1 | 10/2006 | Butterfield et al. | |
| 2015/0254572 | A1* | 9/2015 | Blohm | G06N 99/005 706/12 |

OTHER PUBLICATIONS

Burges "From RankNet to LambdaRank to LambdaMART: An overview," Microsoft Research Technical Report MSR-TR-2010-82, 2010, 19 pages.

Chatterjee, The Aesthetic Brain. Oxford University Press, 2014, 244 pages.

Dalal et al. "Histograms of oriented gradients for human detection," in Proceedings of Computer Vision and Pattern Recognition, 2005, 8 pages.

Hunter "Photoelectric color difference meter," Josa, vol. 48(12):985-993, 1958.

Koenderink "The structure of images," Biological Cybernetics, vol. 50:363-370, 1984.

Lowe "Object recognition from local scale-invariant features," in Computer Vision, 1999. The proceedings of the seventh IEEE international conference on, vol. 2, 8 pages.

Perronnin et al. "Large-scale image retrieval with compressed fisher vectors," in Computer Vision and Pattern Recognition (CVPR), 2010 IEEE Conference on IEEE, 8 pages.

Weston et al. "Wsabie: Scaling up to large vocabulary image annotation," in IJCAI, vol. 11, 7 pages, 2011.

* cited by examiner

5 photos ranked via aesthetic scores

Aesthetic rank spans between +1 to -1 within in a set. +1 indicates highly aesthetic photos, whereas -1 indicates non-aesthetic photos. Here are 5 images ordered according to aesthetic ranks.

|  |  |
|---|---|
| 0.926 | 0.782 |

|  |  |  |
|---|---|---|
| -0.070 | -0.29 | -0.46 |

Search can be accessed from multiple screens within the mobile application:

SYSTEMS, METHODS, AND COMPUTER PROGRAM PRODUCTS FOR SEARCHING AND SORTING IMAGES BY AESTHETIC QUALITY

CROSS REFERENCE TO RELATED APPLICATION(S)

This application is a continuation-in-part of, and claims priority to, U.S. application Ser. No. 14/506,097, entitled "SYSTEMS, METHODS, AND COMPUTER PROGRAM PRODUCTS FOR DISPLAYING IMAGES", filed Oct. 3, 2014. The content of this application is incorporated herein by reference.

TECHNICAL FIELD

The present invention relates generally to systems, methods, and computer program products for enabling users to better manage, sort, search, display, and view images. More particularly, the present invention relates to assigning an aesthetic score to an image based on aesthetic quality.

BACKGROUND OF THE INVENTION

Existing systems for learning-to-rank algorithms are difficult to apply to images. Because text documents contain substantially less data than images and are much more structured (e.g. syntax, semantics, document-level structure) than image data, special care and attention must be taken to ensure that the dimensions of feature vectors used to train a machine-learned model are reasonable. Existing systems cannot simply be converted to apply to image features based on aesthetic quality.

What systems or methods that do exist for assigning an aesthetic score to an image suffer from several drawbacks, including poor performance and being limited to classification rather than ranking These systems fail to assign an aesthetic score that correlates to intuitive notions of aesthetic quality. The use of such systems to order images by aesthetic quality or to search images by aesthetic quality is inadequate.

With over a trillion photographs being taken every year, many of which are in digital format as images on the Internet, it is a growing problem to be able to manage, sort, search, display, and view such images based on aesthetic quality. Thus there is a need for a system, method, and computer program product that assigns an aesthetic score to an image based on aesthetic quality, and that allows for sets of images to be ordered and searched based on aesthetic quality.

SUMMARY OF THE INVENTION

The present invention is directed to systems, methods, and computer program products for assigning an aesthetic score to an image. A plurality of images can be displayed in an order based on their aesthetic scores. A plurality of images can also be searched, such that the search results are ordered based on their aesthetic scores. The aesthetic score can be personalized according to, e.g., a user, a group of users, or an image genre.

Particular embodiments of the present invention are directed to systems, methods, and computer program products for assigning an aesthetic score to at least one image, for ranking and for searching a plurality of images.

In one particular embodiment, a method for assigning an aesthetic score to an image includes receiving an image comprising a set of global features. The method further includes extracting a set of global features for the image, where the extraction includes determining a plurality of scales, and for each of the plurality of scales, segmenting the image into a plurality of regions, such that for each of the plurality of regions (1) a plurality of nearest and farthest regions are computed according to a distance function; (2) a local histogram of oriented gradients is computed; and (3) a color feature is computed. The method further includes encoding the extracted set of global features into a high-dimensional feature vector. The method further includes applying a machine-learned model to assign an aesthetic score to the image, wherein a more aesthetically-pleasing image is given a higher aesthetic score and a less aesthetically-pleasing image is given a lower aesthetic score.

In some embodiments, the segmenting the image comprises using a superpixel algorithm, including a simple linear iterative clustering (SLIC) superpixel algorithm. The computing a plurality of nearest and farthest regions according to a distance function may comprise a distance in CIE-LAB space. The high-dimensional feature vector may comprise a Fisher vector or a bag-of-visual-words (BOV) vector. The machine-learned model may be learned using one of a LambdaMART algorithm, a LambdaRank algorithm, a RankNet algorithm, and a RankSVM algorithm. Alternatively, another algorithm may be used to train the machine-learned model, where the algorithm minimizes either pair-wise or list-wise ranking loss. The reducing the dimension of the high-dimensional feature vector may comprise applying a machine-learned projection matrix to keep the distance between pairs of aesthetic and non-aesthetic images large and between pairs of aesthetic and pairs of non-aesthetic images low. The machine-learned projection matrix may be learned using a WSABIE algorithm.

In some embodiments, the machine-learned model is trained on a subset of training data, whereby the assigned rank is personalized to the subset. The subset may be based on a single user, a group of users, or an image genre. Alternatively, the subset may be selected according to some other quality.

In one particular embodiment, a method for ranking images by aesthetic quality for display includes receiving a plurality of images. The method further includes assigning an aesthetic score to each of the plurality of images. The method further includes displaying the plurality of images based on the aesthetic score.

In some embodiments, the displaying a plurality of images includes displaying a subset of the plurality of images. This subset may be limited to a fixed number of images (e.g. top N), based on a minimum aesthetic score (e.g. $x_{cutoff}$), or based on some other criteria.

In one particular embodiment, a method for searching images by aesthetic quality includes receiving a search query. The method further includes searching a plurality of images based on the search query, whereby a list of search results is generated. The method further includes displaying the list of search results by using a method for ranking images by aesthetic quality for display.

In some embodiments the searching a plurality of images includes searching a plurality of metadata associated with the plurality of images. The displaying the list of search results in an order based on their aesthetic score includes displaying the list of search results in an order based on additional factors such as relevancy, photographer rank, and user history.

In one particular embodiment, a device for assigning an aesthetic score to an image comprises a processor, a memory coupled to the processor, and a network interface coupled to the processor. The processor is configured to receive an image comprising a set of global features. The processor is further configured to extract a set of global features for the image, where the extraction includes determining a plurality of scales, and for each of the plurality of scales, segmenting the image into a plurality of regions, such that for each of the plurality of regions (1) a plurality of nearest and farthest regions are computed according to a distance function; (2) a local histogram of oriented gradients is computed; and (3) a color feature is computed. The processor is further configured to encode the extracted set of global features into a high-dimensional feature vector. The processor is further configured to reduce the dimension of the high-dimensional feature vector. The processor is further configured to apply a machine-learned model to assign an aesthetic score to the image, wherein a more aesthetically-pleasing image is given a higher aesthetic score and a less aesthetically-pleasing image is given a lower aesthetic score.

In one particular embodiment, a computer program product for assigning an aesthetic score to an image comprises a non-transitory computer readable medium storing computer readable program code embodied in the medium. The computer program product further comprises program code for receiving an image comprising a set of global features. The computer program product further comprises program code for extracting a set of global features for the image, where the extraction includes determining a plurality of scales, and for each of the plurality of scales, segmenting the image into a plurality of regions, such that for each of the plurality of regions (1) a plurality of nearest and farthest regions are computed according to a distance function; (2) a local histogram of oriented gradients is computed; and (3) a color feature is computed. The computer program product further comprises program code for encoding the extracted set of global features into a high-dimensional feature vector. The computer program product further comprises program code for reducing the dimension of the high-dimensional feature vector. The computer program product further comprises applying a machine-learned model to assign an aesthetic score to the image, wherein a more aesthetically-pleasing image is given a higher aesthetic score and a less aesthetically-pleasing image is given a lower aesthetic score.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Referring to FIGS. 1-19c, exemplary methods, systems, and computer program products for assigning an aesthetic score to an image and for ranking and searching images by aesthetic quality are provided.

Figure 1:
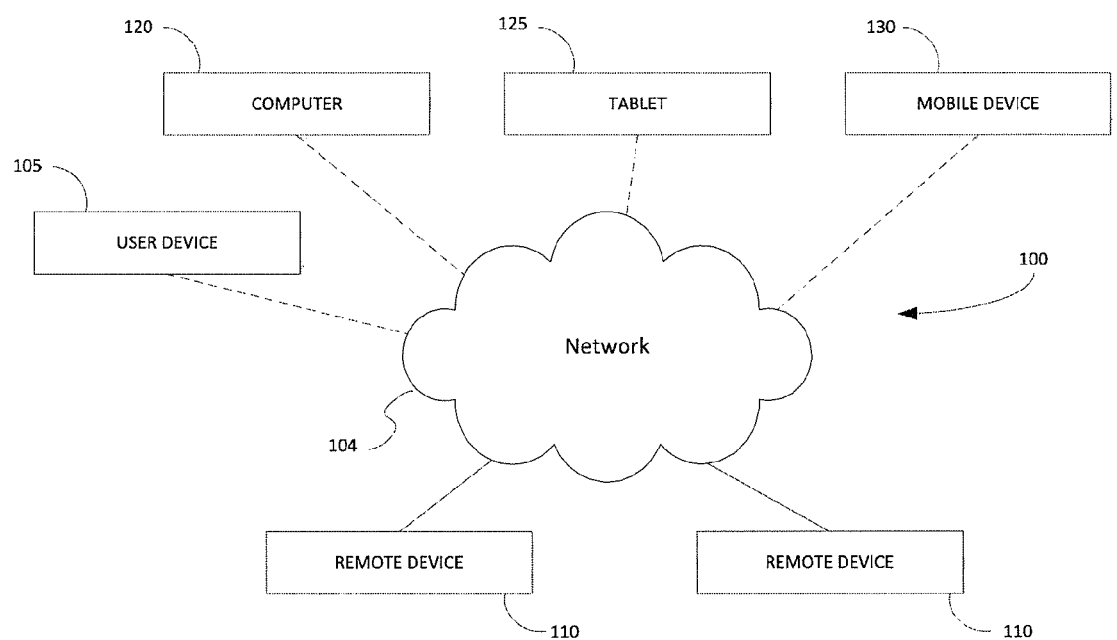
FIG. 1 illustrates an exemplary architecture of a communication system in accordance with exemplary embodiments of the present invention.

Referring now to FIG. 1, an exemplary architecture of a communication system in accordance with embodiments of the present invention is illustrated. System 100 includes at least one remote device 110 that is configured to communicate with one or more user devices 105 through a communications network 104 (e.g., the internet). Examples of user devices include a computer 120 (e.g., laptop or desktop), a tablet 125 (e.g., an iPad), and a mobile device 130 (e.g., a smartphone, such as, for an example, an iPhone). An example of a remote device 110 includes a server. The system, method and computer program product of the present invention can, for example, be deployed as a user/client-server implementation, as an ASP model, or as a standalone application running on a user device 105.

The user device 105 can be configured to communicate with one or more remote devices 110 via the network 104. Remote devices 110 are configured to generate, maintain, and host the computer program product in one embodiment. The remote devices 110 generate, maintain and host web pages (e.g., HTML documents) that embody the present invention. The remote devices 110 include services associated with rendering dynamic web pages, such as data storage services, security services, etc. Accordingly, remote devices 110 can include a conventional hardware arrangement and can be outfitted with software and/or firmware for performing web server functions for performing aspects of the present invention, such as, for example, javascript/jquery, HTML5, CSS2/3, and facilities for SSL, MySQL, PHP, SOAP, etc.

Remote devices 110 may be coupled with a data storage facility, which may include one or more local or remote memory systems or units, and can include one or more databases and/or file systems for storing data, media, graphics, HTML documents, XML documents, etc.

Remote devices 110 can be configured to include an admin function, which enables an administrator to perform system-related functions. The system-related functions can include maintaining user records, performing upgrades on the software and topic content, and the moderation of tasks.

Figure 2:
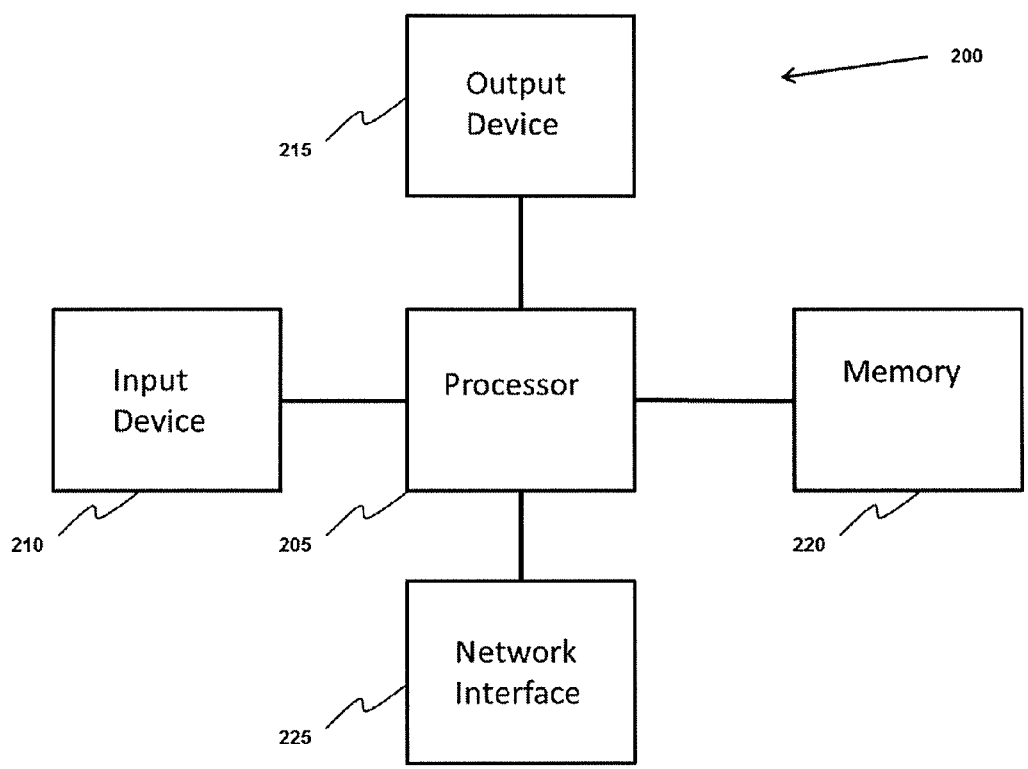
FIG. 2 is a block diagram of a user device in accordance with exemplary embodiments of the present invention.

Referring to FIG. 2, a block diagram of a device 200, such as for example, user device 105, computer 120, tablet 125, and mobile device 130, in accordance with exemplary embodiments of the present invention is illustrated. As shown in FIG. 2, the device 200 may include a processor 205, which may include one or more microprocessors and/or one or more circuits, such as an application specific integrated circuit (ASIC), field-programmable gate arrays (FPGAs), etc.

The device 200 may include a network interface 225. The network interface 225 is configured to enable communication with a communication network, using a wired and/or wireless connection.

The device 200 may include memory 220, such as non-transitive, which may include one or more non-volatile storage devices and/or one or more volatile storage devices (e.g., random access memory (RAM)). In instances where the device 200 includes a microprocessor, computer readable program code may be stored in a computer readable medium or memory, such as, but not limited to magnetic media (e.g., a hard disk), optical media (e.g., a OVO), memory devices (e.g., random access memory, flash memory), etc. The computer program or software code can be stored on a tangible, or non-transitive, machine-readable medium or memory. In some embodiments, computer readable program code is configured such that when executed by a processor, the code causes the device to perform the steps described below and herein. In other embodiments, the device is configured to perform steps described below without the need for code.

It will be recognized by one skilled in the art that these operations, algorithms, logic, method steps, routines, sub-routines, and modules may be implemented in software, in firmware, in special purpose digital logic, and any combination thereof without deviating from the spirit and scope of the present invention as recited within the claims attached hereto.

The device 200 may include an input device 210. The input device is configured to receive an input from either a user or a hardware or software component. Examples of an input device 210 include a keyboard, mouse, microphone, touch screen and software enabling interaction with a touch screen, etc. The device can also include an output device 215. Examples of output devices 215 include monitors, televisions, mobile device screens, tablet screens, speakers, remote screens, etc. The output device 215 can be configured to display images, media files, text, or video, or play audio to a user through speaker output.

Figure 3:
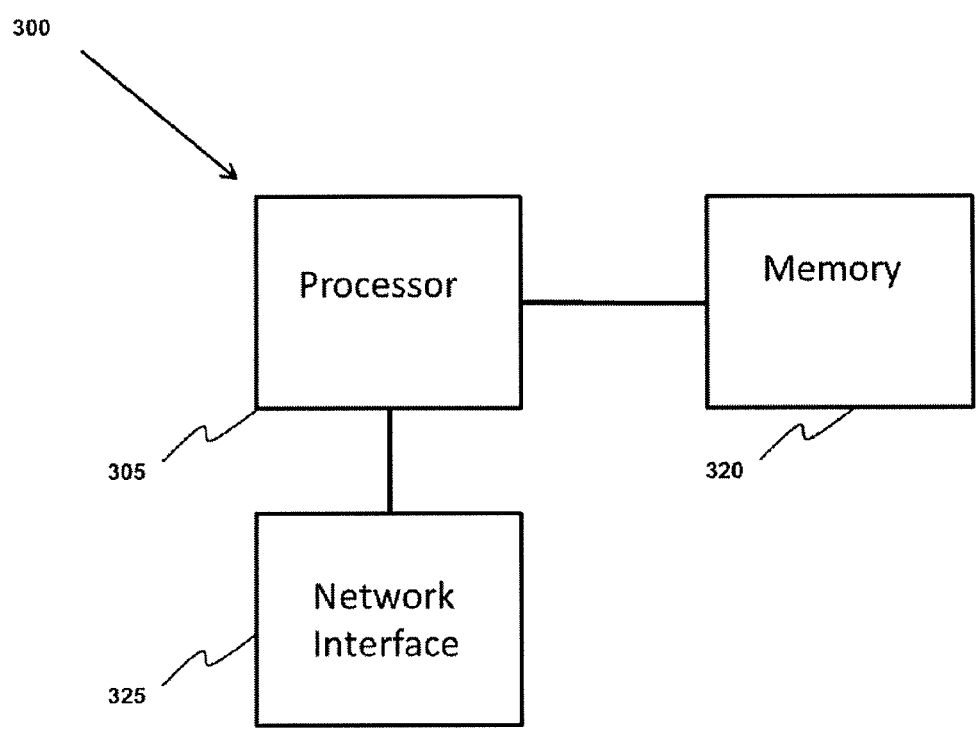
FIG. 3 is a block diagram of a remote device in accordance with exemplary embodiments of the present invention.

Referring now to FIG. 3, a block diagram of a remote device in accordance with exemplary embodiments of the present invention is illustrated. As shown in FIG. 3, the remote device 300 may include a network interface 315 for transmitting and receiving data, a processor 305 for controlling operation of the server device 300, and a memory 310 for storing computer readable instructions (e.g., software) and data. The network interface 315 and memory 310 are coupled to and communicate with the processor 305. Processor 305 controls the operation of network interface 315 and memory 310 and the flow of data and functionality between them. In various embodiments inputs can come from the device 200, to the remote device 300, via the network interface 315. Processing can occur at the remote device 300, at the device 200, or at both. In various embodiments, remote device 300 may be a server.

Processor 305 may include one or more microprocessors, and/or one or more circuits, such as an application specific integrated circuit (ASIC), field-programmable gate arrays (FPGAs), etc. Network interface 225 can be configured to enable communication with a communication network, using a wired and/or wireless connection. Memory 310 can include one or more non-volatile storage devices and/or one or more volatile storage devices (e.g., random access memory (RAM)). In instances where remote device 300 includes a microprocessor, computer readable program code may be stored in a computer readable medium, such as, but not limited to magnetic media (e.g., a hard disk), optical media (e.g., a DVD), memory devices (e.g., random access memory, flash memory), etc. In other embodiments, the device is configured to perform steps described below without the need for code. It will be recognized by one skilled in the art that these operations, logic, method steps, routines, algorithms, sub-routines, and modules may be implemented in software, in firmware, in special purpose digital logic, and any combination thereof without deviating from the spirit and scope of the present invention as recited within the claims attached hereto.

Figure 4:
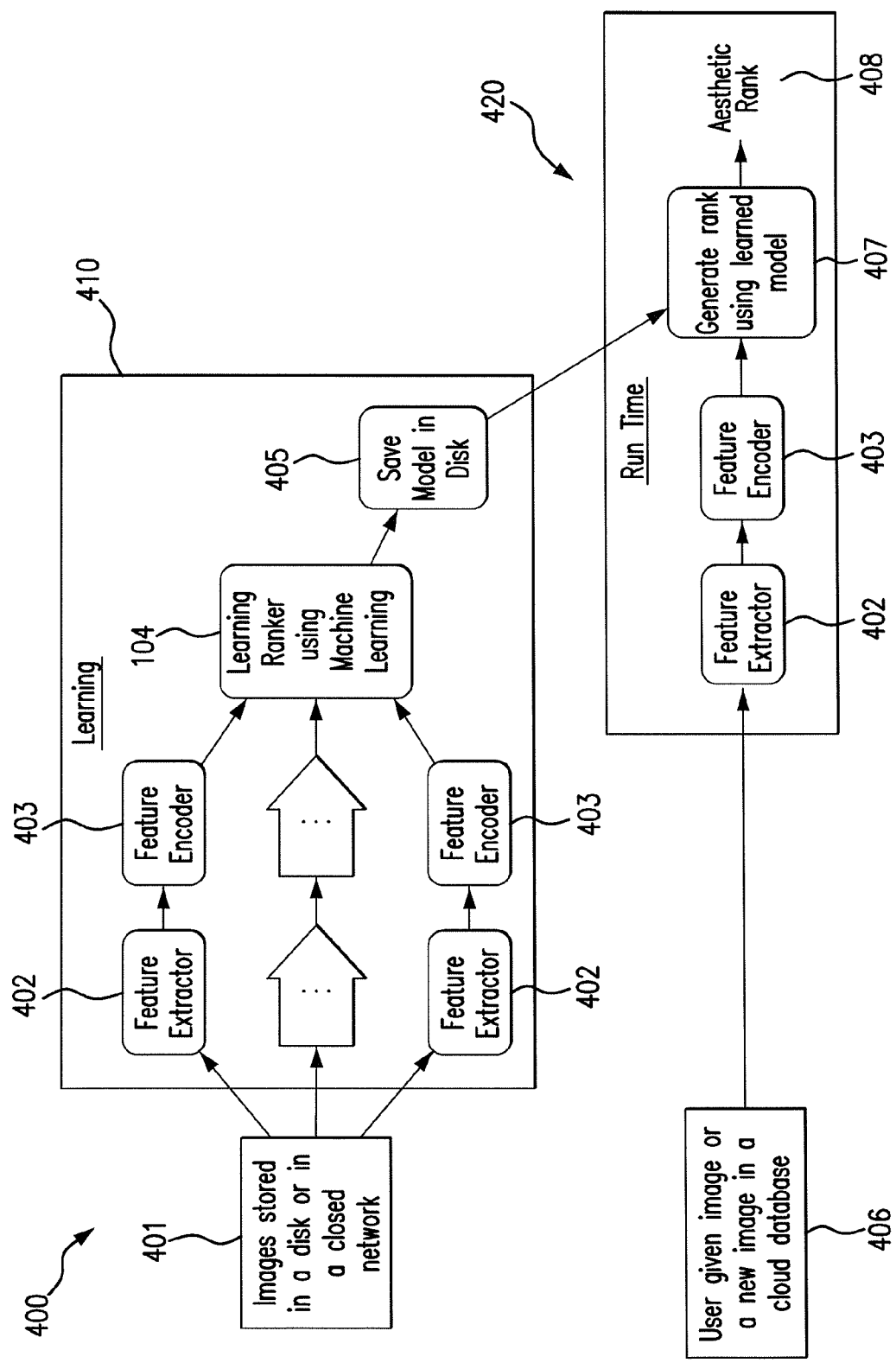
FIG. 4 is a flow diagram illustrating steps of a method for assigning an aesthetic score to an image.

FIG. 4 is a flow diagram illustrating steps of a method for assigning an aesthetic score to an image. In an embodiment of the present invention, this includes a method 410 for training a machine-learned model to assign an aesthetic score to an image and a method 420 for assigning an aesthetic score to an image.

In an embodiment of the present invention, method 410 includes receiving a set of annotated images called training data (step 401). In certain embodiments of the present invention, the training data is in the form of pairwise relationships, e.g. image A is preferred aesthetically over image B or image B is preferred aesthetically over image A. In certain embodiments the relationship may be neutral (i.e. no preference).

Next, in method 410, a set of global features is extracted for each image in the training data (step 402). In certain embodiments of the present invention, the extraction comprises determining a set of scales and segmenting the image into regions at each scale. The extraction further comprises, computing, for each scale and region, a plurality of nearest and farthest regions according to a distance function; a local histogram of oriented gradients; and a color feature. In certain embodiments of the present invention the segmenting is done using a superpixel algorithm, such as a simple linear iterative clustering (SLIC) superpixel algorithm. In certain embodiments, the distance function comprises a distance in CIE-LAB space.

Next, in method 410, the extracted set of global features is encoded into a high-dimensional feature vector (step 403). In certain embodiments of the present invention, the high-dimensional feature vector is a Fisher vector. In other embodiments the high-dimensional feature vector may be a bag-of-visual-words vector.

Next, in method 410, the encoded high-dimensional feature vector is reduced to a smaller dimension (step 403). In certain embodiments of the present invention, the reduction comprises applying a machine-learned projection matrix to keep the distance between pairs of aesthetic images and non-aesthetic images large and pairs of similar images (e.g. both aesthetic or both non-aesthetic) small. In certain embodiments the machine-learned projection matrix is learned using a WSABIE algorithm.

Next, in method 410, the resulting (dimensionally-reduced) feature vector is used to train a machine-learned model. The image annotations, consisting e.g. of pairwise relationships, may also be used to train the model. In certain embodiments of the present invention, the machine-learned model is learned using one of a LambdaMART, LambdaRANK, RankNet, and RankSVM algorithms. Other machine-learning algorithms that minimize pairwise or listwise ranking loss may also be used.

Next, in method 410, the machine-learned model is saved.

In an embodiment of the present invention, method 420 includes receiving an image comprising a set of global features (step 406). In certain embodiments of the present invention, a user may select an image from a remote device or supply the image from a user device. In other embodiments the image may be identified by the remote device in response to a user request to rank or search a set of images.

Next, in method 420, a set of global features is extracted from the received image (step 402).

Next, in method 420, the extracted set of global features is encoded into a high-dimensional feature vector (step 403).

Next, in method 420, the encoded high-dimensional feature vector is reduced to a smaller dimension (step 403).

Next, in method 420, a machine-learned model is applied to assign an aesthetic score to the image (step 407).

Figure 5:
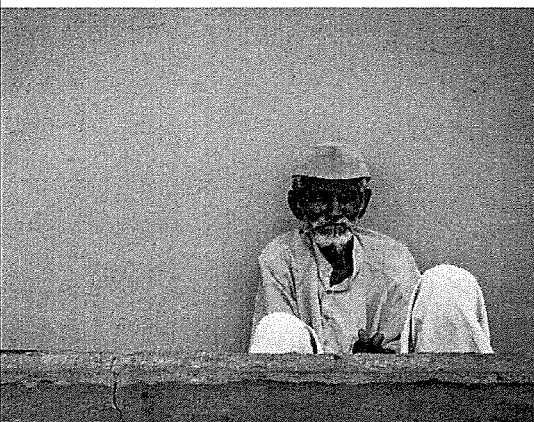
FIG. 5 is a table showing images in an order based on their aesthetic scores in accordance with exemplary embodiments of the present invention.
Figure 5:
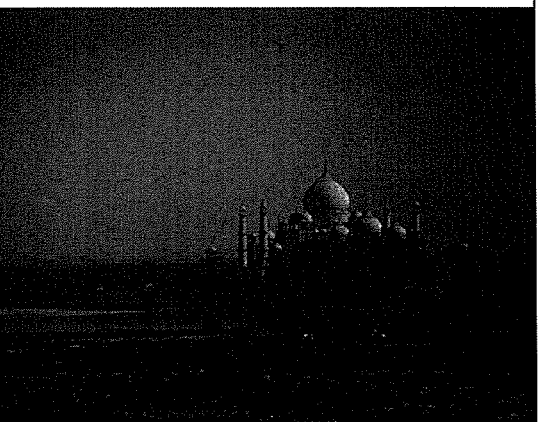
Figure 5:
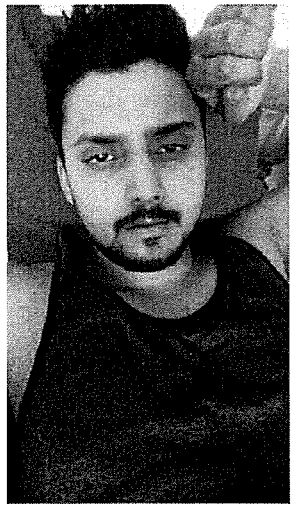
Figure 5:
Figure 5:
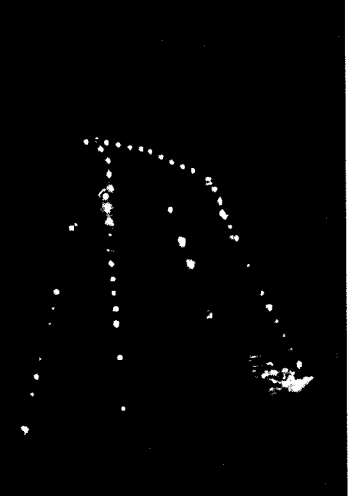

Referring now to FIG. 5, a table showing images in an order based on their aesthetic scores in accordance with exemplary embodiments is provided. In an embodiment of the present invention, a set of images are displayed in an order based on their aesthetic scores. In an embodiment, images 501 are each assigned an aesthetic score 502. The aesthetic scores 502 need not be displayed to a user. In an embodiment, the aesthetic scores 502 are floating point values ranging from −1 to +1, where +1 indicates highly aesthetic images and −1 indicates non-aesthetic images.

Figure 6:
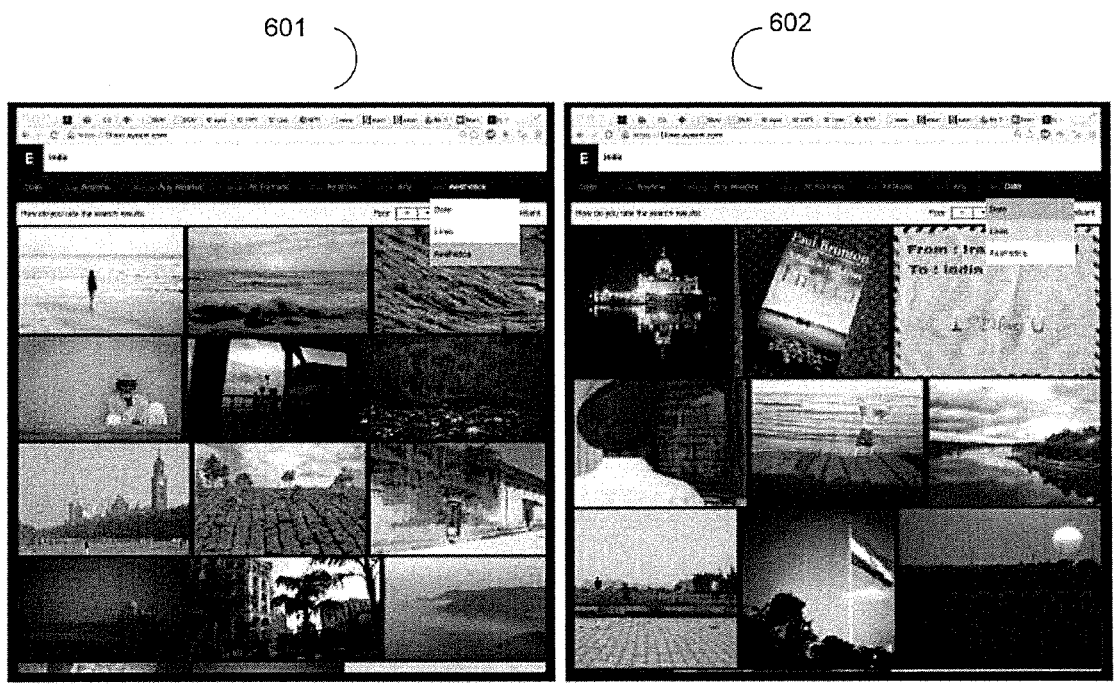
FIG. 6 is an exemplary screen of displaying a list of search results in an order based on their aesthetic scores in accordance with exemplary embodiments of the present invention.

Referring now to FIG. 6, an exemplary screen of displaying a list of search results in an order based on their aesthetic scores in accordance with exemplary embodiments of the present invention. The left screen 601 shows search results ordered based on their aesthetic scores 502. The right screen 602 shows search results for the same search query where the results are not ordered by their aesthetic scores 502.

Figure 7:
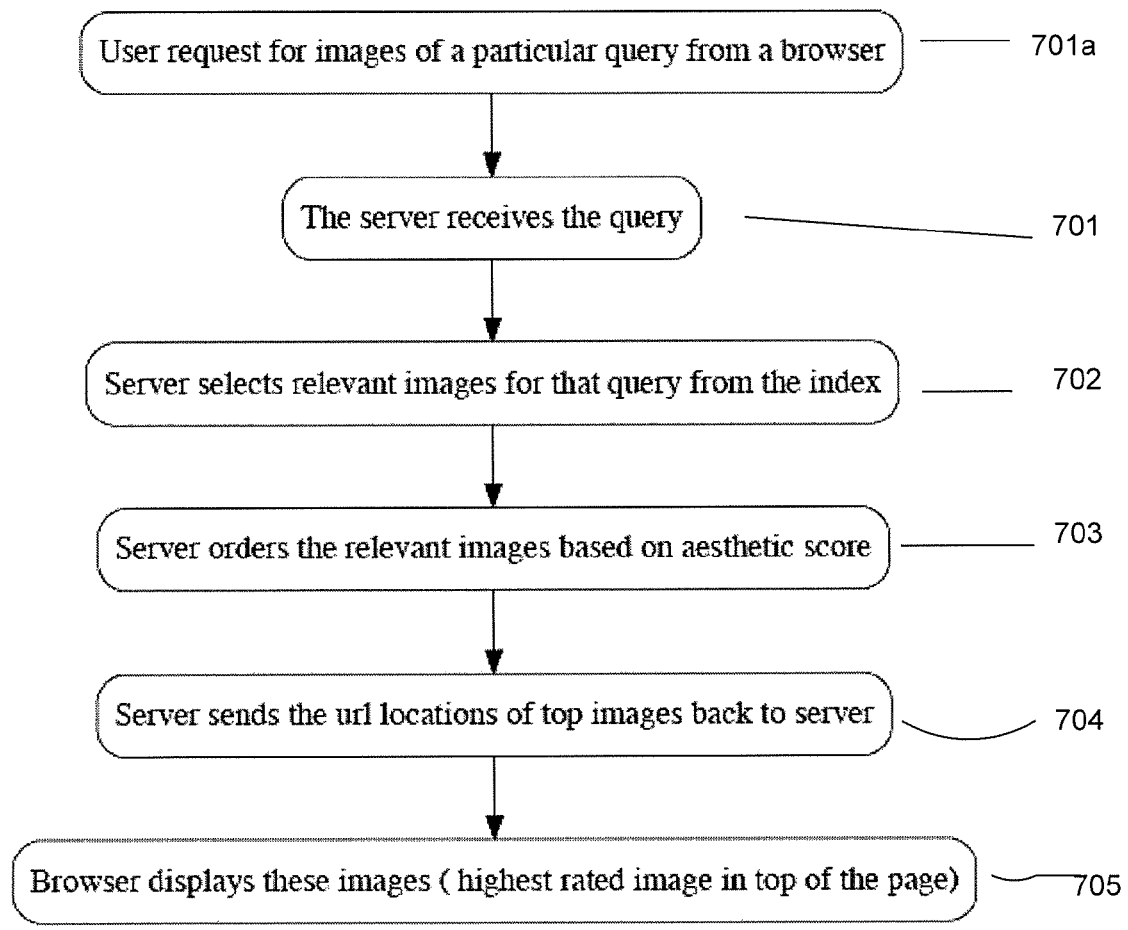
FIG. 7 is a flow diagram illustrating steps of a method for displaying a list of search results in an order based on their aesthetic scores.

FIG. 7 is a flow diagram illustrating steps of a method for displaying a list of search results in an order based on their aesthetic scores. In an embodiment of the present invention, method 700 includes receiving a search query (step 701).

Next, in method 700, the search query is used to generate a list of search results (step 702).

Next, in method 700, the list of search results is displayed in an order based on their aesthetic scores.

Figure 8:
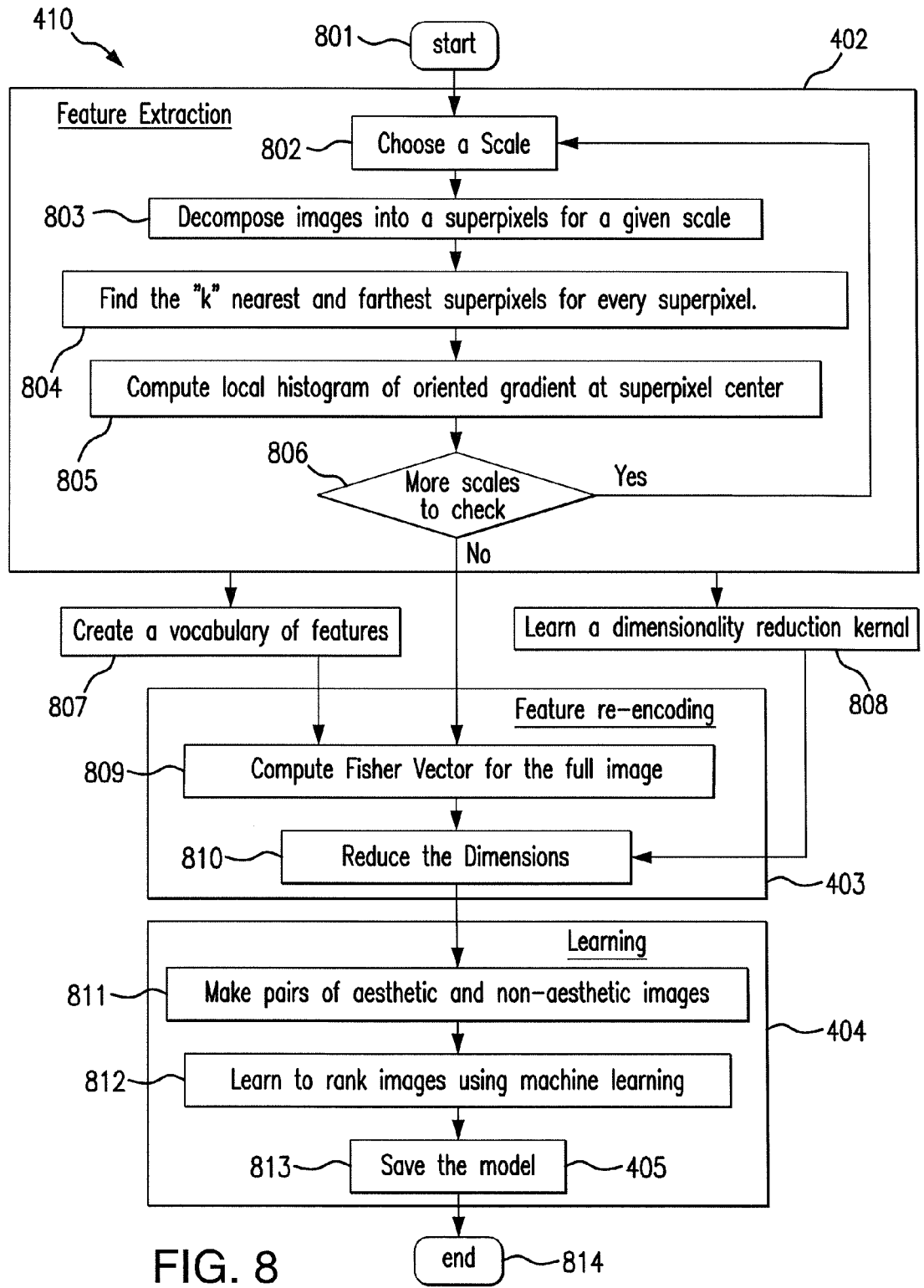
FIG. 8 is a flow diagram illustrating steps of a method for training a machine-learned model to assign an aesthetic score to an image.

FIG. 8 is a flow diagram illustrating steps of a method for training a machine-learned model to assign an aesthetic score to an image. This is a more detailed view of method 410 for training a machine-learned model to assign an aesthetic score to an image.

Figure 9:
FIG. 9 is an exemplary screen of a tool for annotating images in accordance with exemplary embodiments of the present invention.

Referring now to FIG. 9, an exemplary screen of a tool for annotating images in accordance with exemplary embodiments of the present invention is provided.

Figure 10A:
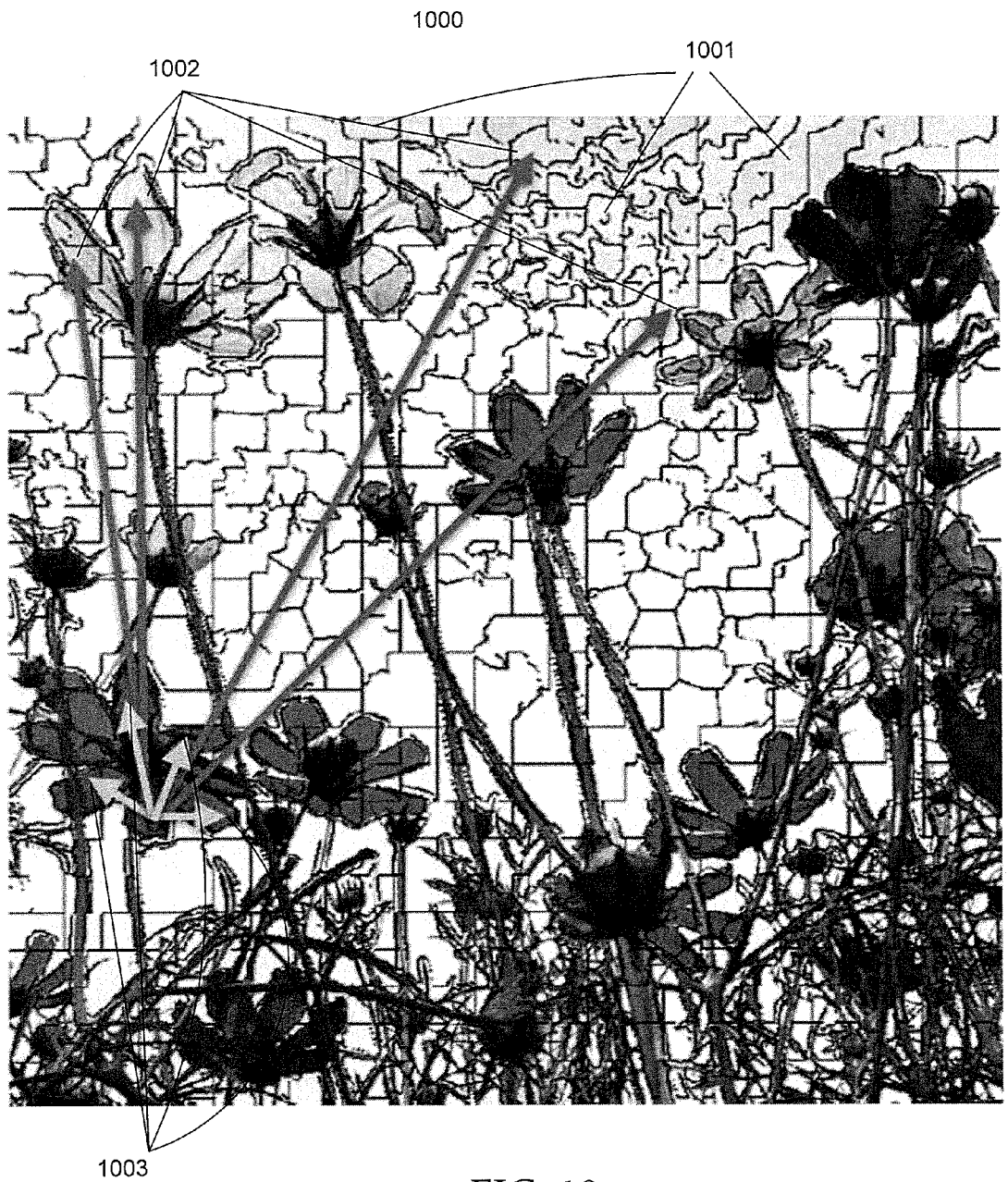
FIG. 10a is a graphical representation of a plurality of nearest and farthest regions according to a distance function computed at a segmented region in accordance with exemplary embodiments of the present invention.

Referring now to FIG. 10a, a graphical representation of a plurality of nearest and farthest regions according to a distance function computed at a segmented region in accordance with exemplary embodiments of the present invention is provided. In an embodiment of the present invention, an image 1000 is segmented into regions 1001. For each region 1001, a plurality of nearest regions 1002 and farthest regions 1003 are extracted to form a feature vector.

Figure 10B:
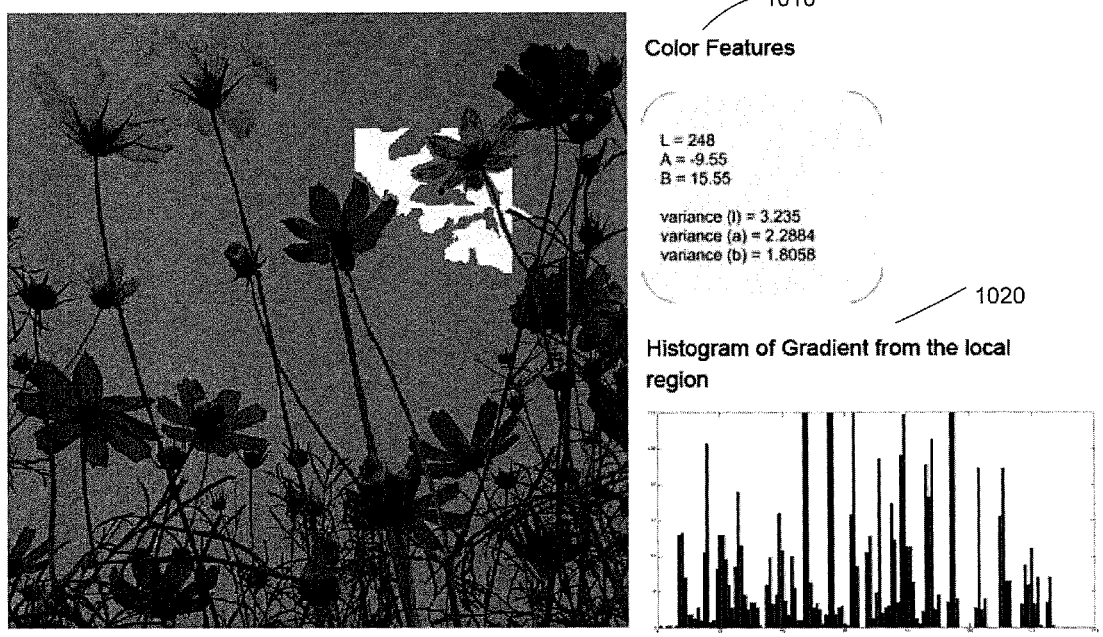
FIG. 10b is a graphical representation of a local histogram of oriented gradients and a color feature computed at a segmented region in accordance with exemplary embodiments of the present invention.

Referring now to FIG. 10b, a graphical representation of a local histogram of oriented gradients and a color feature computed at a segmented region in accordance with exemplary embodiments of the present invention is provided. In an embodiment of the present invention, an image 1000 is segmented into regions 1001. For each region 1001, a local histogram of oriented gradients 1020 and a color feature 1010 are computed.

Figure 11:
FIG. 11 is a graphical representation of image-associated metadata in accordance with exemplary embodiments of the present invention.
Figure 12:
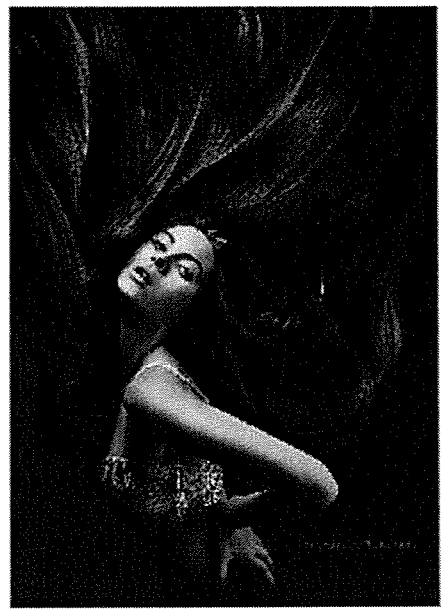
FIGS. 12-16 are pairs of images close in feature space in accordance with exemplary embodiments of the present invention.
Figure 12:
Figure 13:
Figure 13:
Figure 14:
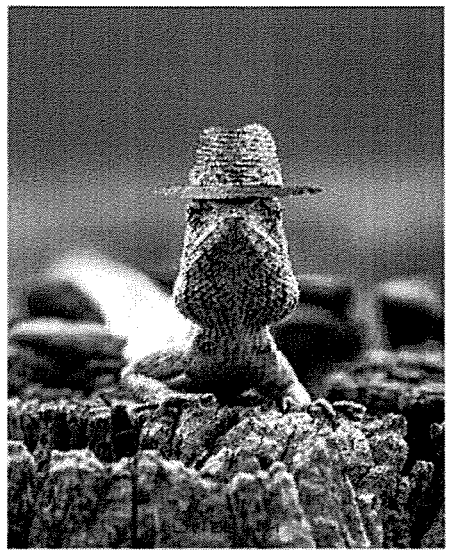
Figure 14:
Figure 15:
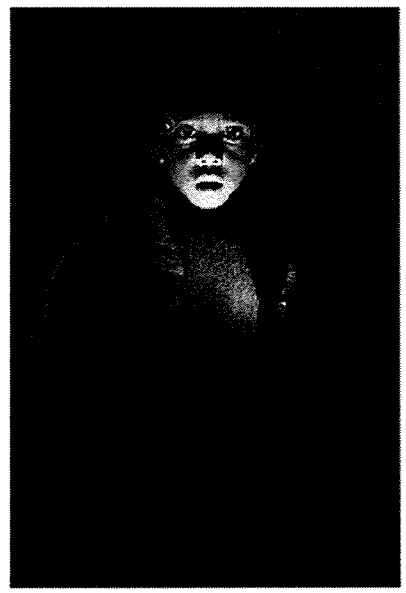
Figure 15:
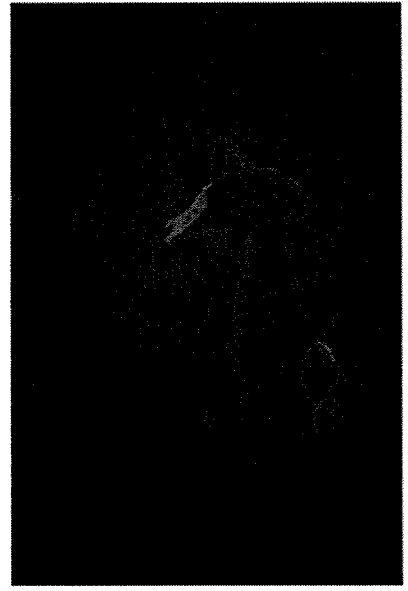
Figure 16:
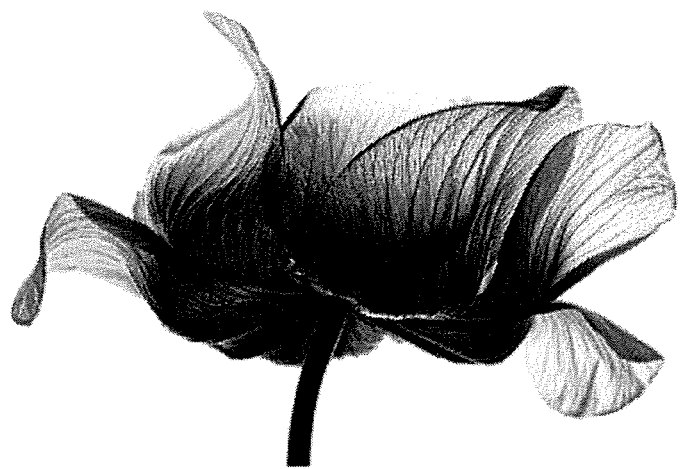
Figure 16:
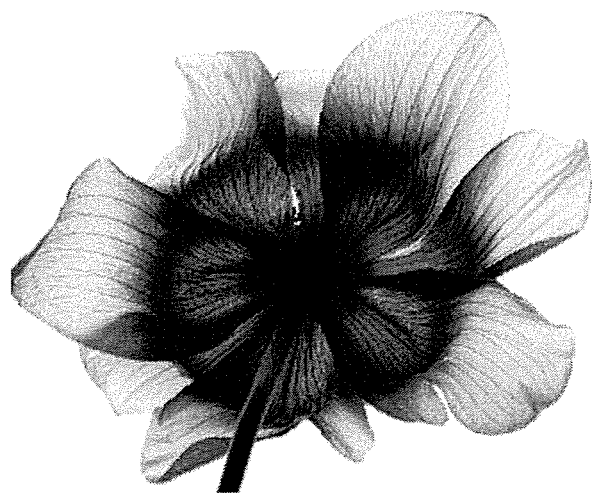

Referring now to FIG. 11, a graphical representation of image-associated metadata in accordance with exemplary embodiments of the present invention is provided. In an embodiment of the present invention, searching a set of images comprises searching metadata associated with a set of images. In an embodiment, an image 1000 may have metadata 1101 associated with it, including tags (e.g. "indoors," "dog," "people," etc.), event information (e.g. "EyeEm Festival and Awards at Berlin, Germany in 2014"), comments, albums, etc.

Referring now to FIGS. 12-16, pairs of images close in feature space in accordance with exemplary embodiments of the present invention are provided.

In one particular embodiment, users may upload images from a smartphone application (or "app"). The app also allows the users to search or sort a set of images based on aesthetic quality. Users can add metadata to images by interacting with the images, for example, commenting on them, tagging them with keywords, providing event information, liking the image, or putting the image in an album. Users can also follow other users. The app allows users to quickly share and access a large set of images, which they can search, order, or filter, based on aesthetic quality of the image and other factors. The app can be deployed and used as part of a social network. In other embodiments, users may access upload, search, sort, and view images through a network (e.g. the Internet or a local intranet), for example by using a web browser.

Figure 17:
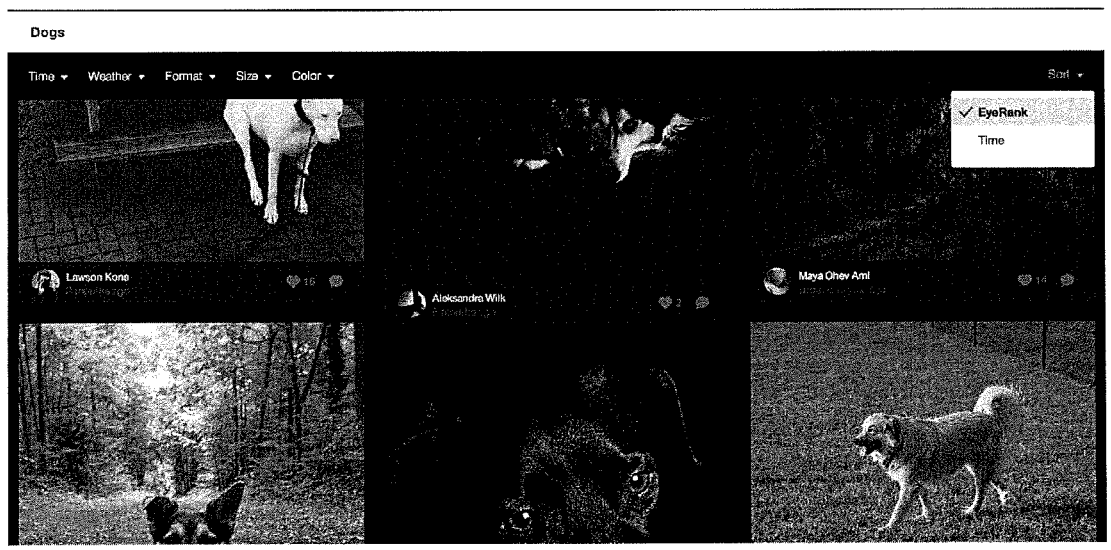
FIGS. 17 and 18 are exemplary screens of a web-based search in accordance with exemplary embodiments of the present invention.
Figure 18:
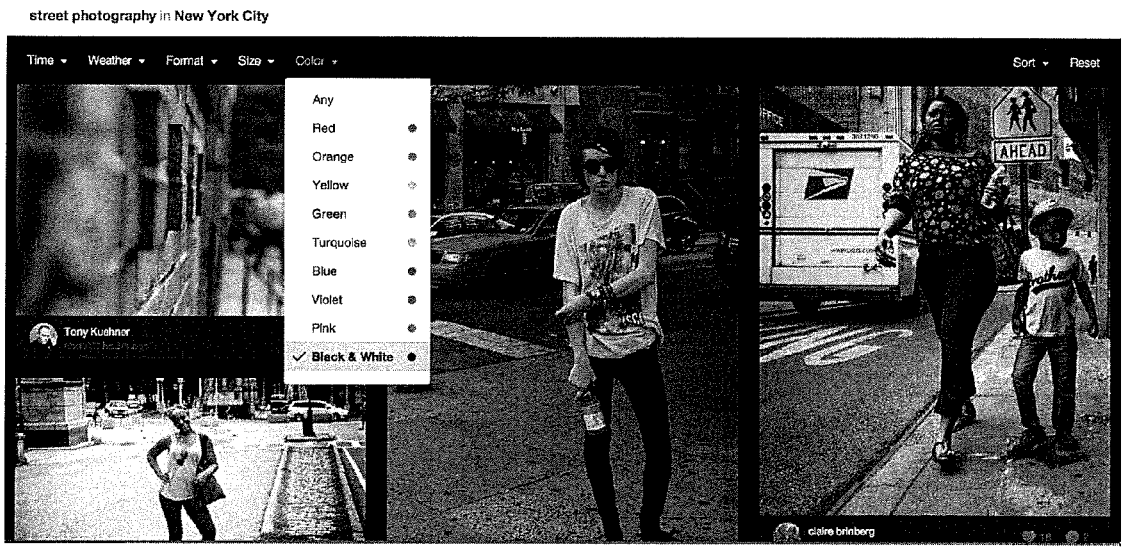
Figure 19A:
FIGS. 19a-c are exemplary screens of a smartphone application in accordance with exemplary embodiments of the present invention.
Figure 19B:
Figure 19C:

Referring now to FIGS. 17-19c, exemplary screens of a web-based search and a smartphone application in accordance with exemplary embodiments of the present invention are provided. For instance, FIG. 17 shows search results for the query "Dogs" ordered based on an image's "EyeRank" value which is based on an image's aesthetic score. FIG. 18 shows search results for the query "street photography," additionally filtered by geographic location ("New York City") and color property ("Black & White"). FIGS. 19a-c shows multiple screens of an app according to one embodiment of the present invention.

In one particular embodiment of the present invention, a user may quickly, efficiently, and accurately zoom-in on a desired location of an image. A user is able to quickly zoom into an image displayed on a device using a single input action. The single input represents the desired zoom location, indicating where the user wants to center the enlarged image. In response to the user input, the user device requests a high resolution image from a remote device that stores the high resolution image. The user device receives the high resolution image and displays the received image to the user. The server the user is communicating with may aggregate the desired zoom location for images across multiple users and multiple user input actions. In one embodiment of the present invention, the feature extraction additionally comprises extracting a feature based on a desired zoom location. This desired zoom location may be based on aggregated data across multiple user input actions. The zoom-feature may be a location, e.g. a mean image pixel, a set of locations, or a distance at a given region to a nearest desired zoom location. In one embodiment, the aggregated data consists of user input actions from users who have uploaded images with high aesthetic scores (e.g. having a high user EyeRank), or from users another subset of users related to the image. Additional aspects of systems, methods, and computer program products for enabling users to better display and view images and, more particularly, to zooming-in to high resolution images with a single user input, are set forth in U.S. application Ser. No. 14/453,185, filed Aug. 6, 2014.

In embodiments where a processor is included, computer readable program code (CRPC) may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the processor to perform steps described above (e.g., steps described above with reference to the flow charts shown in FIGS. 4, 7, and 8).

While various embodiments have been described above, it should be understood that they have been presented by way of example only, and not limitation. Thus, the breadth and scope of the present disclosure should not limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

We claim:

1. A method for assigning an aesthetic score to an image, comprising:
   receiving an image comprising a set of global features;
   extracting a set of global features for the image, the extraction comprising determining a plurality of scales, for each of the plurality of scales, segmenting the image into a plurality of regions, and for each of the plurality of scales and the plurality of regions:
      computing a plurality of nearest and farthest regions according to a distance function;
      computing a local histogram of oriented gradients; and
      computing a color;
   encoding the extracted set of global features into a high-dimensional feature vector;
   reducing the dimension of the high-dimensional feature vector; and
   applying a machine-learned model to assign an aesthetic score to the image, wherein a more aesthetically-pleasing image is given a higher aesthetic score and a less aesthetically-pleasing image is given a lower aesthetic score.

2. The method of claim 1, wherein the segmentation comprises using a superpixel algorithm.

3. The method of claim 2, wherein the superpixel algorithm further comprises using a simple linear iterative clustering (SLIC) algorithm.

4. The method of claim 1, wherein the computing a plurality of nearest and farthest regions according to a distance function comprises at least one of a distance in CIE-LAB space and a distance in appearance space, wherein the appearance space comprises the local histogram of oriented gradients.

5. The method of claim 1, wherein the high-dimensional feature vector is a Fisher vector.

6. The method of claim 1, wherein the high-dimensional feature vector is a bag-of-visual-words vector.

7. The method of claim 1, wherein the machine-learned model is learned using a LambdaMART algorithm.

8. The method of claim 1, wherein the machine-learned model is learned using a LamdaRank algorithm.

9. The method of claim 1, wherein the machine-learned model is learned using a RankNet algorithm.

10. The method of claim 1, wherein the machine-learned model is learned using a RankSVM algorithm.

11. The method of claim 1, wherein the machine-learned model is learned using a method that minimizes at least one of pairwise and list-wise ranking loss.

12. The method of claim 1, wherein the reduction of the high-dimensional feature vector comprises applying a machine-learned projection matrix to keep the distance between pairs of aesthetic images and non-aesthetic images large and the distance between pairs of aesthetic images and aesthetic images and the distance between pairs of non-aesthetic images and non-aesthetic images small.

13. The method of claim 12, wherein the machine-learned projection matrix is learned using a WSABIE algorithm.

14. The method of claim 1, wherein the machine-learned model is trained on a subset of training data, whereby the assigned rank is personalized to the subset.

15. The method of claim 14, wherein the subset of training data is based on a single user.

16. The method of claim 14, wherein the subset of training data is based on a group of users.

17. The method of claim 14, wherein the subset of training data is based on an image genre.

18. A method for ranking images by aesthetic quality for display, comprising:
   receiving a plurality of images;
   assigning an aesthetic score to each of the plurality of images, wherein the aesthetic score is generated by the method of claim 1; and
   displaying the plurality of images in an order based on the aesthetic score.

19. The method of claim 18, wherein the displaying the plurality of images comprises displaying a subset of the plurality of images.

20. The method of claim 19, wherein the subset of the plurality of images is limited to a fixed number of images.

21. The method of claim 19, wherein the subset of the plurality of images is based on a minimum aesthetic score.

22. A method for searching images by aesthetic quality, comprising:
   receiving a search query;
   searching a plurality of images based on the search query, whereby a list of search results is generated; and
   displaying the list of search results by the method of claim 18.

23. The method of claim 22, wherein the searching a plurality of images comprises searching a plurality of metadata associated with the plurality of images.

24. A device for assigning an aesthetic score to an image, comprising:
   a processor;
   a memory coupled to the processor; and
   a network interface coupled to the processor,
   wherein the processor is configured to:
      receive an image comprising a set of global features;
      extract a set of global features for the image, the extraction comprising determining a plurality of scales, for each of the plurality of scales, segmenting the image into a plurality of regions, and for each of the plurality of scales and the plurality of regions:

computing a plurality of nearest and farthest regions according to a distance function;
computing a local histogram of oriented gradients; and
computing a color;
encode the extracted set of global features into a high-dimensional feature vector;
reduce the dimension of the high-dimensional feature vector; and
apply a machine-learned model to assign an aesthetic score to the image, wherein a more aesthetically-pleasing image is given a higher aesthetic score and a less aesthetically-pleasing image is given a lower aesthetic score.

25. A computer program product for assigning an aesthetic score to an image, said computer program product comprising a non-transitory computer readable medium storing computer readable program code embodied in the medium, said computer program product comprising:

program code for receiving an image comprising a set of global features;

program code for extracting a set of global features for the image, the extraction comprising determining a plurality of scales, for each of the plurality of scales, segmenting the image into a plurality of regions, and for each of the plurality of scales and the plurality of regions:
  computing a plurality of nearest and farthest regions according to a distance function;
  computing a local histogram of oriented gradients; and
  computing a color;
program code for encoding the extracted set of global features into a high-dimensional feature vector;
program code for reducing the dimension of the high-dimensional feature vector; and
program code for applying a machine-learned model to assign an aesthetic score to the image, wherein a more aesthetically-pleasing image is given a higher aesthetic score and a less aesthetically-pleasing image is given a lower aesthetic score.

* * * * *